(12) United States Patent
Chang et al.

(10) Patent No.: US 12,080,882 B2
(45) Date of Patent: Sep. 3, 2024

(54) CATHODE ACTIVE MATERIAL FOR LITHIUM SECONDARY BATTERY, AND LITHIUM SECONDARY BATTERY COMPRISING CATHODE INCLUDING CATHODE ACTIVE MATERIAL

(71) Applicant: SAMSUNG SDI CO., LTD., Yongin-si Gyeonggi-do (KR)

(72) Inventors: Donggyu Chang, Yongin-si (KR); Jongmin Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 4 days.

(21) Appl. No.: 17/494,686

(22) Filed: Oct. 5, 2021

(65) Prior Publication Data

US 2022/0029154 A1 Jan. 27, 2022

Related U.S. Application Data

(62) Division of application No. 16/412,185, filed on May 14, 2019, now Pat. No. 11,152,610.

(30) Foreign Application Priority Data

May 15, 2018 (KR) .................. 10-2018-0055658

(51) Int. Cl.
*H01M 4/36* (2006.01)
*H01M 4/02* (2006.01)
(Continued)

(52) U.S. Cl.
CPC .......... *H01M 4/366* (2013.01); *H01M 4/505* (2013.01); *H01M 4/525* (2013.01); *H01M 4/628* (2013.01);
(Continued)

(58) Field of Classification Search
CPC ...... H01M 4/366; H01M 4/505; H01M 4/525; H01M 4/628; H01M 10/0525;
(Continued)

(56) References Cited

U.S. PATENT DOCUMENTS 8,728,666 B2* 5/2014 Itou ........................ H01M 4/525
429/223
9,614,226 B2* 4/2017 Paulsen ................. H01M 4/623
(Continued)

FOREIGN PATENT DOCUMENTS

| CN | 101156260 A | 4/2008 |
| CN | 104584284 A | 4/2015 |

(Continued)

OTHER PUBLICATIONS

US 10,707,485 B2, 07/2020, Kim et al. (withdrawn)
(Continued)

*Primary Examiner* — Daniel S Gatewood
(74) *Attorney, Agent, or Firm* — Lewis Roca Rothgerber Christie LLP

(57) ABSTRACT

Provided are a cathode active material for a lithium secondary battery, a method of preparing the same, and a lithium secondary battery including a cathode including the cathode active material. The cathode active material includes: a secondary particle of a nickel-based active material, wherein the secondary particle including a plurality of primary particles, wherein the secondary particle includes a radial arrangement structure and an irregular porous structure, the radial arrangement structure is located closer to a surface of the secondary particle than the irregular porous structure, and a lithium fluoride-based compound is present on a surface of the nickel-based active material.

12 Claims, 7 Drawing Sheets

(51) Int. Cl.
  *H01M 4/505* (2010.01)
  *H01M 4/525* (2010.01)
  *H01M 4/62* (2006.01)
  *H01M 10/0525* (2010.01)

(52) U.S. Cl.
  CPC .. *H01M 10/0525* (2013.01); *H01M 2004/021* (2013.01); *H01M 2004/028* (2013.01)

(58) Field of Classification Search
  CPC ..... H01M 2004/021; H01M 2004/028; H01M 4/485; H01M 4/62; H01M 10/052; H01M 10/058; C01G 53/006; C01G 53/50; C01P 2004/03; C01P 2004/51; C01P 2004/61; C01P 2006/16; Y02E 60/10; Y02P 70/50
  See application file for complete search history.

(56) References Cited

U.S. PATENT DOCUMENTS

| | | | |
|---|---|---|---|
| 9,887,420 | B2 | 2/2018 | Park et al. |
| 9,972,834 | B2 | 5/2018 | Kong et al. |
| 2009/0087362 | A1 | 4/2009 | Sun et al. |
| 2015/0093580 | A1* | 4/2015 | Kobayashi ............ H01M 4/525 428/403 |
| 2015/0147655 | A1 | 5/2015 | Park et al. |
| 2015/0243971 | A1* | 8/2015 | Cho .................... H01M 4/0471 429/231.1 |
| 2016/0036041 | A1* | 2/2016 | Uwai .................... C01G 53/50 429/231.1 |
| 2017/0222221 | A1* | 8/2017 | Park ...................... C01G 53/50 |
| 2017/0271653 | A1* | 9/2017 | Yamauchi ............. H01M 4/525 |
| 2018/0019464 | A1 | 1/2018 | Xia et al. |
| 2018/0026267 | A1 | 1/2018 | Kim et al. |
| 2018/0026268 | A1* | 1/2018 | Kim ...................... C01G 53/42 429/223 |
| 2018/0159128 | A1 | 6/2018 | Kim et al. |
| 2018/0166687 | A1 | 6/2018 | Chang et al. |
| 2018/0212237 | A1 | 7/2018 | Lee et al. |
| 2018/0287135 | A1 | 10/2018 | Shin et al. |
| 2021/0399287 | A1 | 12/2021 | Xia et al. |

FOREIGN PATENT DOCUMENTS

| | | |
|---|---|---|
| CN | 107210422 A | 9/2017 |
| CN | 107644981 A | 1/2018 |
| CN | 107644982 A | 1/2018 |
| CN | 108028369 A | 5/2018 |
| EP | 3272710 A1 | 1/2018 |
| EP | 3272711 A1 | 1/2018 |
| EP | 3331066 A1 | 6/2018 |
| EP | 3333129 A1 | 6/2018 |
| JP | 2015-72800 A | 4/2015 |
| JP | 2015-530721 A | 10/2015 |
| JP | 2015-533257 A | 11/2015 |
| JP | 2016-81903 | 5/2016 |
| JP | 2018-014326 A | 1/2018 |
| JP | 2018-510450 A | 4/2018 |
| KR | 10-2010-0099337 A | 9/2010 |
| KR | 10-1475575 B1 | 12/2014 |
| KR | 10-2015-0100406 A | 9/2015 |
| KR | 10-1593401 B1 | 2/2016 |
| KR | 10-2017-0063395 A | 6/2017 |
| KR | 10-2018-0010122 A | 1/2018 |

OTHER PUBLICATIONS

Office action dated Nov. 26, 2021 issued in corresponding CN Patent Application No. 201910403350.5, including English translation 13pp.
EPO Extended Search Report dated Oct. 31, 2019, for corresponding European Patent Application No. 19174235.2, 7 pages.
Japanese Patent Office, Third Party Observation issued in corresponding Japanese Application No. 2019-92126, Nov. 16, 2020, 15 pages.
Korean Intellectual Property Office Action for corresponding Korean Patent Application (Korean only) Application No. 10-2018-0055658, dated May 8, 2020, 6 pages.
Sun, Yang-Kook et al., "The Role of AlF3 Coatings in Improving Electrochemical Cycling of Li-Enriched Nickel-Manganese Oxide Electrodes for Li-Ion Batteries," Advanced Materials, 2012, vol. 24, 5 pages.

* cited by examiner

CATHODE ACTIVE MATERIAL FOR LITHIUM SECONDARY BATTERY, AND LITHIUM SECONDARY BATTERY COMPRISING CATHODE INCLUDING CATHODE ACTIVE MATERIAL

CROSS-REFERENCE TO RELATED APPLICATIONS

This application is a divisional of U.S. patent application Ser. No. 16/412,185, filed May 14, 2019, which claims priority to and the benefit of Korean Patent Application No. 10-2018-0055658, filed May 15, 2018, the entire content of both of which is incorporated herein by reference.

BACKGROUND

1. Field

One or more embodiments of the present disclosure relate to a cathode active material for lithium secondary batteries, and a lithium secondary battery including a cathode including the cathode active material.

2. Description of the Related Art

In accordance with the development of portable electronic devices, communication devices, and the like, there is a great interest in developing lithium secondary batteries having a high energy density.

Among cathode active materials of lithium secondary batteries, nickel-based active materials are capable of realizing high capacity, and thus, research on nickel-based active materials has been actively conducted. However, the reliability of a lithium battery using a nickel-based active material may deteriorate due to unreacted residual lithium present at the surface of the nickel-based active material, and thus, improvement in this regard would be beneficial.

SUMMARY

One or more embodiments provide cathode active materials in which the amount of residual lithium is small, the occurrence of cracks is suppressed or reduced during charging and discharging, and an increase in resistance is reduced, thereby improving lifetime.

One or more embodiments provide lithium secondary batteries, each of which includes a cathode including the cathode active material to improve cell performance.

Additional aspects of embodiments will be set forth in part in the description which follows and, in part, will be apparent from the description, or may be learned by practice of the presented embodiments.

According to one or more embodiments, a cathode active material for a lithium secondary battery includes: a secondary particle of a nickel-based active material, wherein the secondary particle includes a plurality of primary particles, wherein the secondary particle includes a radial arrangement structure and an irregular porous structure, the radial arrangement structure is located closer to a surface of the secondary particle as compared with the irregular porous structure, and a lithium fluoride-based compound is present on a surface of the nickel-based active material.

According to one or more embodiments, a cathode active material for a lithium secondary battery includes: a secondary particle including an aggregate of two or more primary particles, wherein the secondary particle includes a radial arrangement structure in which the primary particles are aligned such that a (003) plane of each of the primary particles is perpendicular to an outermost plane of the secondary particle, 50% or more of the primary particles are arranged to have the radial arrangement structure, and a lithium fluoride-based compound is present on a surface of the secondary particle. The secondary particle may be a secondary particle of a nickel-based active material.

According to one or more embodiments, a lithium secondary battery includes: a cathode including the cathode active material; an anode; and an electrolyte between the cathode and the anode.

According to one or more embodiments, a method of preparing the nickel-based active material includes:
performing a first heat treatment on a mixture comprising a lithium source and a metal hydroxide in an oxidative gas atmosphere to obtain nickel-based active material secondary particles; and
adding a fluoride precursor to the nickel-based active material secondary particles to obtain a reaction mixture, and performing a second heat treatment on the reaction mixture in an oxidizing gas atmosphere, wherein the second heat treatment is performed at a lower temperature than the first heat treatment.

BRIEF DESCRIPTION OF THE DRAWINGS

These and/or other aspects of embodiments will become apparent and more readily appreciated from the following description of embodiments, taken in conjunction with the accompanying drawings in which.

DETAILED DESCRIPTION

Figure 1:
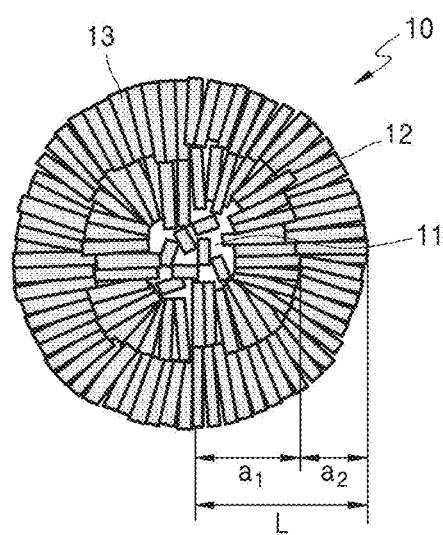
FIG. 1 is a schematic view illustrating a cross-sectional structure of a cathode active material for a lithium secondary battery according to an embodiment of the present disclosure.

Reference will now be made in more detail to embodiments of the present disclosure, examples of which are illustrated in the accompanying drawings, wherein like reference numerals refer to like elements throughout. In this regard, embodiments of the present disclosure may have different forms and should not be construed as being limited to the descriptions set forth herein. Accordingly, the embodiments are merely described below, by referring to the figures, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a cathode active material for lithium secondary batteries, a preparation method thereof, a cathode including the cathode active material, and a lithium secondary battery including the cathode will be described in more detail with reference to the attached drawings.

Hereinafter, a cathode active material according to an embodiment of the present disclosure will be described with reference to FIGS. 1 to 3. FIG. 1 is a schematic view illustrating a cross-sectional structure of a cathode active material according to an embodiment. FIGS. 2A-2C are schematic views illustrating a cathode active material particle having a plate shape according to embodiments of the disclosure, and FIG. 3 is a schematic view for illustrating a radial form of a cathode active material secondary particle according to embodiments of the disclosure.

The cathode active material for a lithium secondary battery according to embodiments of the disclosure, as shown in FIG. 1, includes a nickel-based active material 10 (e.g., a secondary particle) including a radial arrangement structure 12 and an irregular porous structure 11. The nickel-based active material 10 is a secondary particle. The radial arrangement structure 12 may be located closer to a surface of the nickel-based active material 10 (e.g., the secondary particle) than the irregular porous structure 11. For example, the irregular porous structure 11 may be at the center of the secondary particle 10, and the radial arrangement structure 12 may at least partially surround the irregular porous structure 11. In some embodiments, fluorine or a lithium fluoride-based compound may be present on the surface of the nickel-based active material 10.

Because the cathode active material according to embodiments of the disclosure includes the nickel-based active material 10 having both the radial arrangement structure and the irregular porous structure, an initial efficiency is increased and a capacity is improved, as compared with existing cathode active materials. When the cathode active material of embodiments of the disclosure is used in a battery, the amount of gas generated during high-temperature storage may be effectively reduced, and the life characteristics of the battery are improved.

Referring to FIG. 1, the nickel-based active material 10 (e.g., the secondary particle) of embodiments of the disclosure may include a plurality of primary particles 13, and the primary particles 13 may include plate particles (e.g., plate-shaped particles). For example, some of the primary particles 13 may be arranged to form the radial arrangement structure 12, and others of the primary particles 13 may be arranged to form the irregular porous structure 11 (e.g., a porous structure having the primary particles arranged irregularly or randomly). Also, a long axis of each of the plate particles is aligned in a radial direction.

Figure 2A:
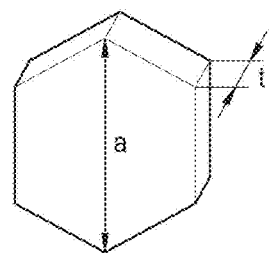
FIGS. 2A-2C are schematic views showing plate particles of a cathode active material according to an embodiment of the present disclosure.
Figure 2B:
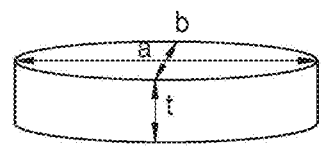
Figure 2C:
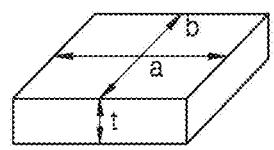
Figure 3:
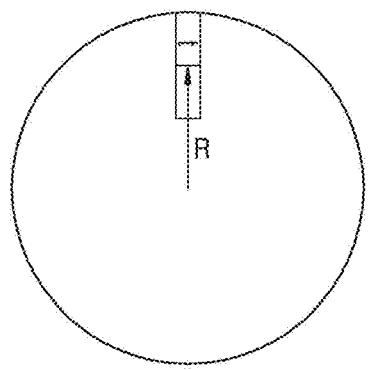
FIG. 3 is a schematic view illustrating the definition of a radial form in a cathode active material secondary particle according to an embodiment of the present closure.

Referring to FIGS. 2A-2C, in the plate particles, the length t of the plate particle in one axial direction (for example, a thickness direction) may be shorter than the long axis length a of the plate particle in another direction (for example, a plane direction such as in a direction of a plane that is substantially perpendicular to the thickness direction). The plate particle may have a polygonal nanoplate shape such as a hexagonal nanoplate shape as shown in FIG. 2A.

The plate particle, may have a nanodisc shape as shown in FIG. 2B. The plate particle may have a rectangular parallelepiped shape as shown in FIG. 2C, but the present disclosure is not limited thereto. In some embodiments, the thickness t of the plate particle is smaller than the length a and/or b (e.g., the long axis length a or a short axis length b) of the plate particle in the plane direction. The plate particles may be arranged such that the plate thickness plane is oriented to the surface of the secondary particle. For example, the plate thickness plane may face, and/or constitute, the surface of the secondary particle. In this case, the crystal plane through which lithium may enter and exit (e.g., enter and exit the secondary particle and/or at least one of the primary particles) is exposed at the surface of a secondary particle. The average length of the plate particles may be about 150 nm to about 500 nm, or, for example, about 200 nm to about 400 nm. The average length refers to an average of a long side length (e.g., the long axis length a) and a short side length (e.g., the short axis length b) in the plane direction of the plate particle. The long side length refers to a length of the longest side in the corresponding plane, and the short side length refers to a length of the shortest side in the corresponding plane. Thus, as used herein, the term "average length" refers to the mathematical average of the length of the longest side in the corresponding plane and the length of the shortest side in the corresponding plane. The average thickness of the plate particles is about 100 nm to about 200 nm. The ratio of the average thickness to the average length of the plate particles may be 1:2 to 1:10, for example, 1:2 to 1:5. The average length, the average thickness, and the ratio of the average thickness to the average length of the plate particles may be determined using SEM.

As a result of the radial arrangement structure 12, the primary particles are aligned such that the thickness direction of the primary particle is perpendicular (e.g., substantially perpendicular) to a center direction of the secondary particle or forms a direction of ±10° with respect to a vertical (e.g., center) direction. As used herein, the terms "center direction" and "vertical direction" may refer to an axis that passes generally through a center of the secondary particle and may be substantially parallel to the long axis of at least one of the primary particles in the radial arrangement structure. In some embodiments, at least 30%, for example, at least 50%, of the primary particles are aligned such that the thickness direction t of the primary particle is perpendicular (e.g., substantially perpendicular) to the center direction of the secondary particle or forms a direction of ±10° with respect to the vertical (e.g., center) direction, thereby forming a radial arrangement structure. In addition, for example, less than 30% of the primary particles are arbitrarily arranged (e.g., less than 30% of the primary particles are not arranged in a center direction of the secondary particle or a direction of ±10° with respect to the vertical (e.g., center) direction in the radial arrangement structure 12. In more detail, referring to FIG. 3, the plate particles are aligned such that the thickness direction t of the plate particle is perpendicular (e.g., substantially perpendicular) to a direction toward the center of the secondary particle or forms a direction of ±10° with respect to the vertical (e.g., center) direction. As such, the active material including the radial arrangement structure may facilitate the diffusion of lithium, may suppress or reduce the stress due to a change in volume at the time of lithium charging and discharging, and thus, suppress or reduce the occurrence of cracks. Further, the active material including the radial arrangement structure may reduce a surface resistance layer at the time of manufacturing, and provide a diffusion direction of lithium at the surface of the secondary particle, and thus, the active surface area useful for lithium diffusion may be made large.

As a result of the irregular porous structure 11, the primary particles 13 are arbitrarily (or randomly) arranged without regularity. In more detail, the plate particles (e.g., the primary particles) may be arbitrarily arranged without regularity to form an irregular porous structure, and, in some embodiments, the irregular porous structure 11 includes at least 30% of the primary particles 13 arbitrarily arranged without being arranged along a center direction of the secondary particle or a direction of ±10° with respect to the center direction. In addition, for example, less than 30% of the primary particles in the irregular porous structure 11 are aligned such that the thickness direction t of the primary particle is perpendicular to the center direction of the secondary particle or forms a direction of ±10° with respect to the center direction. The irregular porous structure 11 may have a larger pore size than the radial arrangement structure 12.

The radial arrangement structure 12 may be located closer to the surface of the nickel-based active material 10 (e.g., the secondary particle) than the irregular porous structure 11. For example, the radial arrangement structure 12 may be located in the outer portion of the nickel-based active material 10, and the irregular porous structure 11 may be located in the inner portion of the nickel-based active material 10. Referring to FIG. 1, the outer portion a2 may refer to a region from the outermost surface of the nickel-based active material 10 to a point corresponding to about 30% to about 50%, for example, 40% of L which is a total length from the center of the nickel-based active material 10 to the surface thereof. The inner portion a1 may refer to a region from the center of the nickel-based active material 10 to a point corresponding to about 50% to about 70%, for example, 60% of L.

The pore size (e.g., the average pore size) of the inner portion a1 is in a range of about 150 nm to about 1 μm, for example, about 150 nm to about 550 nm, for example, about 200 nm to about 500 nm, and the pore size (e.g., the average pore size) of the outer portion a2 is less than 150 nm, for example, 100 nm or less, for example, about 20 nm to about 90 nm. As such, because the pore size of the inner portion a1 is larger than the pore size of the outer portion a2, the lithium diffusion distance in the secondary particles of the same (e.g., substantially the same) size may be made shorter, and a volume change occurring during charging and discharging may be reduced without exposing the pores to an electrolyte.

As used herein, the term "pore size" refers to an average diameter of pores when the pores are generally spherical or generally circular. As used herein, the term "pore size" refers to a long axis length (e.g., an average long axis length) of a pore when the pore is elliptic.

The inner portion a1 of the nickel-based active material 10 may be provided with closed pores, and the outer portion a2 thereof may be provided with closed pores and/or open pores. Closed pores are difficult to contain electrolytes, whereas open pores may contain electrolytes therein. For example, the closed pores may be impermeable or substantially impermeable to the electrolyte. The term "closed pore," as used herein, refers to an independent pore in which all the walls of the pore are closed to provide no connection to other pores, while the term "open pore" refers to a continuous pore having an opening in at least a part of the pore walls, thereby providing a continuous (or substantially continuous) connection to the outside of the particle. The size of the open pore may be less than 150 nm, for example, may be in a range of about 10 nm to about 100 nm, and for example, about 25 nm to about 145 nm.

The secondary particle may have a size (e.g., an average particle size or average particle diameter) in a range of about 2 μm to about 20 μm, for example, about 3 μm to about 14 μm, and for example, about 8 μm to about 10 μm. As referred to herein, the size of the secondary particle may indicate an average diameter when the shape thereof is approximate to a circle (e.g., when the secondary particles are spherical). The average particle diameter denotes D50. The average particle diameter may be measured by a particle size analyzer (PSA).

The nickel-based active material 10 of embodiments of the disclosure may be represented by Formula 1 below.

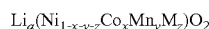

$$Li_a(Ni_{1-x-y-z}Co_xMn_yM_z)O_2 \quad \text{Formula 1}$$

In Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al); and $0.90 \leq a \leq 1.3$, $x \leq (1-x-y-z)$, $y \leq (1-x-y-z)$, $z \leq (1-x-y-z)$, $z \leq (1-x-y-z)$, $0 < x < 1$, and $0 \leq y < 1$, and $0 \leq z < 1$ are satisfied. In embodiments, in Formula 1, a, x, y and z may satisfy the following relations: $0.95 \leq a \leq 1.05$, $0 < x \leq 1/3$, for example, $0.05 \leq x \leq 1/3$ may be satisfied, $0 \leq y \leq 0.5$, for example, $0.05 \leq y \leq 1/3$, $0 \leq z \leq 0.05$, and $1/3 \leq (1-x-y-z) \leq 0.95$ may be satisfied. In Formula 1, when $0 < z \leq 0.05$ is satisfied, M may be aluminum (Al). In some embodiments, in Formula 1, z may be 0.

The amount of nickel in the nickel-based active material 10 may be in a range of about 30 mol % to about 99 mol % (for example, 33 mol % to about 95 mol %) based on the total amount of transition metals (Ni, Co, and Mn). The amount of nickel in the nickel-based active material 10 may be larger than the amount of manganese or the amount of cobalt. The amount of nickel is about 30 mol % to about 60 mol %, for example about 34 mol % to about 60 mol %. The amount of nickel in the nickel-based active material 10 may be larger than the amount of another transition metal based on the total 1 mole of total transition metals. When the nickel-based active material 10 has a large nickel content as described above, a lithium secondary battery having high lithium diffusivity, good conductivity, and higher capacity at the same (e.g., substantially the same) voltage may be manufactured. The nickel-based active material 10 may be, for example, $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, or $LiNi_{0.85}Co_{0.1}Al_{0.05}O_2$.

The porosity of the nickel-based active material 10 according to embodiments of the disclosure may be in a range of about 1% to about 10%, for example, about 1.5% to about 8%. The porosity of the outer portion of the nickel-based active material may be smaller than the porosity of the inner portion thereof. In more detail, the porosity of the inner portion may be about 2% to about 20% (e.g., about 5% to about 15%, or about 10%), and the porosity of the outer portion may be about 0.1% to about 5% (e.g., about 1% to about 3%, or about 2%). As used herein, the term "porosity" refers to a ratio of the area occupied by the pores to the total area.

The fluorine may be present on the surface of the nickel-based active material 10 in the form of a lithium fluoride-based compound. The lithium fluoride-based compound may be a compound produced by reacting residual lithium present on the surface of the nickel-based active material with a fluorine compound (e.g., a fluoride precursor). In more detail, the fluorine may be present on the surface of the nickel-based active material 10 in the form of lithium fluoride (LiF). Because the lithium fluoride-based compound is produced by reacting residual lithium present on the surface with a fluorine compound (e.g., a fluoride precursor), residual lithium (e.g., at the surface of the secondary particle) may be reduced. Due to the reduction of residual lithium, a side reaction with an electrolyte may be reduced by the reduction of residual lithium, and the lifetime characteristics of a battery may be improved.

The fluorine or lithium fluoride-based compound may be present in the state of a film or a particle. As used herein, the term "film" refers to a continuous or discontinuous coating film. As used herein, the term "particle" includes not only a spherical particle but also an amorphous particle. The fluorine or the lithium fluoride-based compound may be included in an amount in a range of about 0.01 parts by weight to about 1 part by weight based on 100 parts by weight of the nickel-based active material. When the amount of fluorine is in the above range, the amount of residual lithium in the nickel-based active material is reduced, thereby improving the reliability of a lithium secondary battery using the nickel-based active material.

Figure 4:
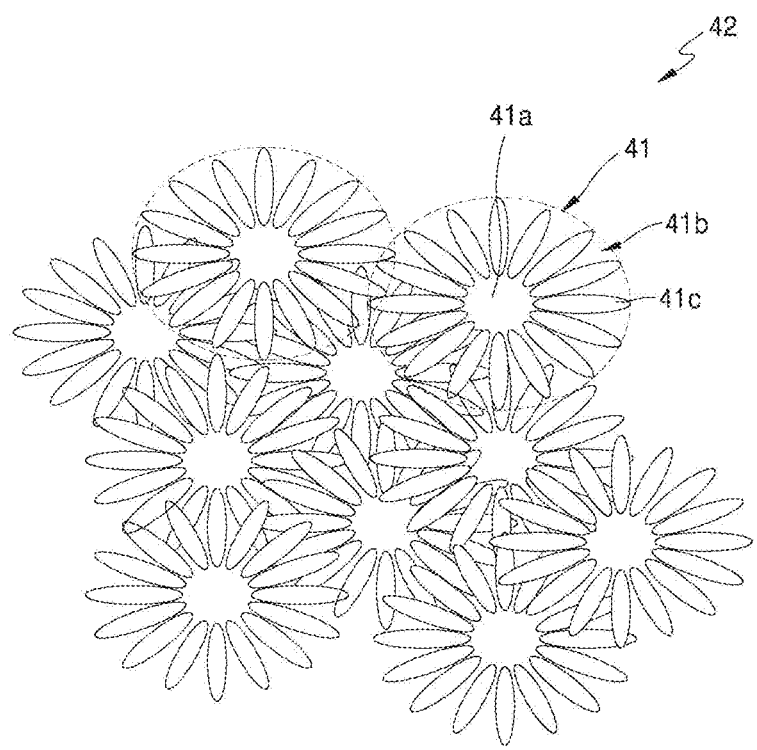
FIG. 4 is a schematic view illustrating a cross-sectional structure of a cathode active material according to an embodiment of the present disclosure.

Hereinafter, a cathode active material according to another embodiment of the present disclosure will be described with reference to FIG. 4. FIG. 4 is a schematic view illustrating a cross-sectional structure of a cathode active material according to another embodiment of the present disclosure. Because the cathode active material according to embodiments of the disclosure is substantially the same (e.g., substantially the same) as the aforementioned cathode active material except that it includes two or more secondary particle structures and that it includes at least two radial centers, substantially the same components will not be described in more detail, and different components will be mainly described. As used herein, the term "radial center" refers to a center of a secondary particle structure including a porous inner structure and a radial arrangement structure.

The cathode active material according to embodiments of the disclosure includes at least one aggregated secondary particle including two or more secondary particle structures, and includes at least two radial centers. The nickel-based active material according to embodiments of the disclosure may stably realize capacity characteristics as compared with other nickel-based active materials having the same or substantially the same composition, and may reduce the moving distance of lithium ions from the surface to the center because it has at least two radial centers, so as to increase the usage of lithium ions.

Referring to FIG. 4, the primary particle structure 41 includes a porous inner structure 41a and a radial arrangement structure 41b, and the nickel-based active material secondary particle 42 includes at least two of the primary particle structures 41. The primary particle structure 41 is an aggregate formed by arranging two or more primary particles 41c. The primary particle structure 41 may be formed of a nickel-based active material. The radial arrangement structure 41b may be located closer to a surface of the secondary particle structure 41 than the porous inner structure 41a.

The porous inner structure 41a may have an irregular porous structure or a regular porous structure. The porous inner structure 41a may include plate particles (e.g., plate-shaped primary particles). When the porous inner structure 41a has an irregular porous structure, the plate particles may be arranged without regularity.

The radial arrangement structure 41b, as shown in FIG. 4, may have structure in which plate particles, as primary particles 41c, are radially arranged. The meaning of the term "radial arrangement structure" is the same as described herein above.

The size of the primary particle structure 41 is in a range of about 2 μm to about 5 μm, for example, about 3 μm to about 4 μm, and the size of the nickel-based active material secondary particle 42 is in a range of about 5 μm to about 25 μm, for example, about 5 μm to about 22 μm, for example, about 7 μm to about 20 μm, and for example, about 9 μm to about 15 μm.

In the primary particle structure 41, the porosity of the porous inner structure 41a is in a range of about 5% to about 15%, for example, about 5% to about 10%, and the porosity of the radial arrangement structure 41b is about 1% to about 5%, for example, about 1% to about 3%. When the porosity of the primary particle structure 41 is within the above range, a nickel-based active material having excellent capacity characteristics may be obtained.

According to an embodiment, the porosity of the radial arrangement structure 41b of the primary particle structure 41 may be controlled to be smaller than the porosity of the porous inner structure 41a thereof. The pore size and porosity in the porous inner structure 41a may be larger and more irregular than the pore size and porosity in the radial arrangement structure 41b. When the porosity of the porous inner structure 41a of the primary particle structure 41 and the porosity of the radial arrangement structure 41b thereof satisfy the above ranges, respectively, outer compactness becomes higher than that of inner compactness, and thus, a side reaction with an electrolyte may be effectively suppressed or reduced.

The porous inner structure 41a of the primary particle structure 41 may be provided with closed pores, and the radial arrangement structure 41b thereof may be provided with closed pores and/or open pores. Closed pores are difficult to contain an electrolyte (e.g., may be impermeable or substantially impermeable to the electrolyte), whereas open pores may contain an electrolyte in the pores of the primary particle structure 41.

Figure 5:
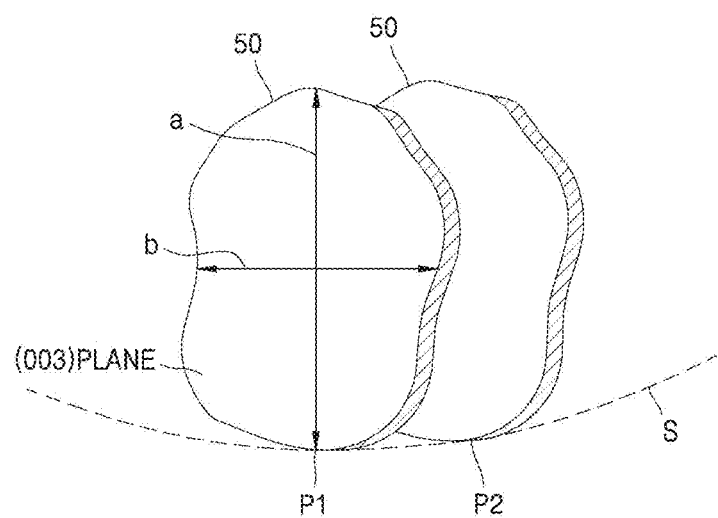
FIG. 5 is a schematic view illustrating the alignment of primary particles in a cathode active material according to another embodiment of the present disclosure.

Hereinafter, a cathode active material according to another embodiment of the present disclosure will be described with reference to FIG. 5. FIG. 5 is a schematic view for explaining the alignment of primary particles in a cathode active material according to another embodiment of the present disclosure. The cathode active material according to embodiments of the disclosure is substantially the same as the aforementioned cathode active material except that it has a different radial arrangement structure. Thus, a radial arrangement structure, as a different component, will be mainly described, and a duplicative description of substantially the same components that are described elsewhere herein will not be repeated here.

The cathode active material according to embodiments of the disclosure includes a secondary particle including an aggregate of two or more primary particles. The secondary particle, as shown in FIG. 5, includes a radial arrangement structure in which the primary particles 50 are aligned such that the (003) plane of each the primary particles 50 is perpendicular (e.g., substantially perpendicular) to the outermost plane S of the secondary particles. The outermost plane S may refer to a plane connected along the outermost edge of the secondary particle. The vertical direction means that the (003) plane intersects with the outermost plane S of the secondary particles at an angle of 90°±20°, for example, 90°±10° to each other. In this case, 50% or more of the primary particles, for example, 60% or 70% or more of the primary particles may have the radial arrangement structure.

A (003) plane of the primary particle is a plane derived from a layered crystal structure, and the (003) plane refers to a crystal plane in which intercalation and deintercalation of lithium ions (Li$^+$) is performed satisfactorily. A lithium fluoride-based compound is present on the surface of the secondary particle (e.g., present on the surface of the nickel-based active material). Due to such a primary particle arrangement, the cathode active material according to embodiments of the disclosure has excellent lithium ion conductivity and reduced surface resistance.

Hereinafter, a cathode active material according to another embodiment of the present disclosure will be described. Because the cathode active material according to embodiments of the disclosure is substantially the same as the aforementioned cathode active material except that a heterogeneous element compound is placed between the primary particles, duplicative description of the components that are substantially the same will not be repeated here.

The cathode active material according to embodiments of the disclosure includes a secondary particle including aggregates of two or more primary particles, and a heterogeneous element compound may be placed between the primary particles. For example, the secondary particle is an aggregate of primary particles, and a heterogeneous element compound is included between the primary particles. For example, the heterogeneous element compound may be present at a grain boundary of primary particles and/or on a surface of primary particles. As disclosed herein, a grain boundary of primary particles and/or a surface of primary particles are encompassed by the description "between the primary particles." In the cathode active material according to embodiments of the disclosure, the heterogeneous element compound may be placed or included to improve lifetime characteristics and the like.

The heterogeneous element compound, which is a compound including a hetero-element, may be a compound including at least one selected from zirconium (Zr), titanium (Ti), aluminum (Al), magnesium (Mg), tungsten (W), phosphorus (P), and boron (B). The heterogeneous element compound may include both lithium (Li) and a hetero-element. The amount of the heterogeneous element is in a range of about 0.0001 mol to about 0.1 mol, for example, about 0.0005 mol to about 0.03 mol, for example, about 0.001 mol to about 0.03 mol, and for example, about 0.001 mol to about 0.01 mol, based on 1 mol of the transition metal (e.g., the total mole ratio) of the nickel-based active material.

Hereinafter, a method of manufacturing the nickel-based active material according to an embodiments of the disclosure will be described.

First, nickel-based active material secondary particles may be prepared by mixing a lithium source and metal hydroxide at a predetermined molar ratio and subjecting the mixture to a first heat treatment at about 600° C. to about 900° C.

The metal hydroxide may be a compound represented by Formula 2 below.

$(Ni_{1-x-y-z}Co_xMn_yM_z)(OH)_2$      Formula 2

In Formula 2, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al); and x≤(1-x-y-z), y≤(1-x-y-z), z≤(1-x-y-z), 0<x<1, 0≤y<1, and 0≤z<1 are satisfied. In Formula 2, 0<x≤1/3 is satisfied, and 0≤y≤0.5, 0≤z≤0.05, and 1/3≤(1-x-y-z)≤0.95 are satisfied. The metal hydroxide represented by Formula 2 may be, for example, $Ni_{0.6}Co_{0.2}Mn_{0.2}(OH)_2$, $Ni_{0.5}Co_{0.2}Mn_{0.3}(OH)_2$, $Ni_{1/3}Co_{1/3}Mn_{1/3}(OH)_2$, $Ni_{0.8}Co_{0.1}Mn_{0.1}(OH)_2$, or $Ni_{0.85}Co_{0.1}Al_{0.05}(OH)_2$.

As the lithium source, for example, lithium hydroxide, lithium fluoride, lithium carbonate, or a mixture thereof may be used. The mixing ratio of a lithium precursor and metal hydroxide is stoichiometrically adjusted so as to prepare the nickel-based active material of Formula 1.

The mixing may be dry mixing or may be carried out using a mixer and/or the like. Dry mixing may be carried out using milling. In this case, milling is carried out under the condition that there is almost no deformation such as atomization of the metal hydroxide used as a starting material. For this purpose, the size of the lithium precursor to be mixed with the metal hydroxide may be controlled in advance. The size (e.g., the average particle diameter) of the lithium precursor may be in the range of about 5 μm to about 20 μm, for example, about 10 μm. When the lithium precursor having such a size is milled with metal hydroxide at 300 rpm to 3,000 rpm (e.g., 1500 rpm to 2500 rpm), a suitable or desired nickel-based active material may be obtained. The term "average particle diameter," as used herein, refers to D50, and the average particle diameter may be measured using, for example, a particle size analyzer (made in U.S.A.). When the temperature in the mixer rises to 30° C. or higher in the above milling process, a cooling process may be performed to maintain the temperature in the mixer at room temperature (e.g., 25° C.). The size of the metal hydroxide is approximately equal to the size of the nickel-based active material.

The first heat treatment is carried out in an oxidizing gas atmosphere. The oxidizing gas atmosphere uses an oxidizing gas such as, for example, oxygen or air. For example, the oxidizing gas may have an oxygen concentration of 20% or more and an inert gas concentration of less than 80%. The first heat treatment is suitably carried out in the range of crystallization temperature or higher while a reaction between the lithium source and the metal (hydroxide) precursor proceeds. Here, the crystallization temperature refers to a temperature at which suitable or sufficient crystallization may be achieved to realize a charging capacity of the active material. The first heat treatment is carried out at a temperature in a range of about 600° C. to about 900° C., for example, about 750° C. to about 850° C.. The first heat treatment time is variable depending on the heat treatment temperature and/or the like, but, as an example, the first heat treatment may be carried out for a time period in a range of about 2 hours to about 20 hours. The nickel-based active material secondary particles according to embodiments of the disclosure may be produced by performing the first heat treatment under the above-described conditions. During the first heat treatment, a metal compound or non-metal compound including at least one selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al) may be added. Examples of the metal compound may include magnesium oxide, calcium carbonate, strontium carbonate, barium carbonate, titanium oxide, vanadium oxide, chromium oxide, iron oxide, copper oxide, zirconium oxide, and aluminum oxide. Examples of the non metal compound may include boric acid. When the metal compound or non-metal compound is added during the first heat treatment, the metal compound may be doped into a nickel compound.

Subsequently, a fluoride precursor is added to the nickel-based active material secondary particles prepared in this way to obtain a reaction mixture, and the reaction mixture is subjected to a second heat treatment process performed in an oxidizing gas atmosphere at a temperature in a range of 300° C. or higher and lower than 600° C., for example, about 300° C. to about 550° C., for example, about 350° C. to about 500° C. When the second heat treatment is carried out in the above temperature range, it may have a feature of generating a surface fluorine compound while suitably or appropriately maintaining the size of the primary particles and the secondary particles.

The amount of the fluorine precursor is stoichiometrically controlled so that the content of the lithium fluoride-based compound is in the range of 0.01 to 1 part by weight based on 100 parts by weight of the nickel-based active material.

A lithium fluoride-based compound is formed on the surface of the nickel-based active material through the secondary heat treatment process. Lithium in the lithium fluoride-based compound is derived from residual lithium in the surface of the nickel-based active material. The second heat treatment time is variable depending on heat treatment temperature and the like, but, as an example, the second heat treatment may be carried out for a time period in a range of about 2 hours to about 20 hours.

As the fluoride precursor, at least one selected from a fluorine-containing polymer and a metal fluoride may be used. The fluorine-containing polymer may be at least one selected from polyvinylidene fluoride, a vinylidene fluoride-hexafluoropropylene copolymer, and polytetrafluoroethylene. The metal fluoride may be at least one selected from $MgF_2$, $MnF_2$, $LaF_3$, $BiF_3$, $PbF_2$, $KF$, $CaF_2$, $BaF_2$, $SnF_2$, $SrF_2$, $AlF_3$, $ZrF_4$, $GaF_3$, $HfF_4$, $YbF_3$, $ThF_3$, $ZnF_2$ $InF_3$, $UF_3$, $YF_3$, $CuF_2$, $CoF_2$, $FeF_2$, $FeF_3$, $NiF_2CrF_2$, $MnF_3$, $NaF$, and $TiF_3$. During the second heat treatment, a heterogeneous element compound including at least one selected from zirconium (Zr), titanium (Ti), aluminum (Al), magnesium (Mg), tungsten (W), phosphorus (P), and boron (B) may be added. Alternatively, a heterogeneous element compound including lithium and a compound including at least one element selected from zirconium (Zr), titanium (Ti), aluminum (Al), magnesium (Mg), tungsten (W), phosphorus (P), and boron (B) may be added. Examples of the heterogeneous element compound may include titanium oxide, zirconium oxide ($ZrO_2$), aluminum oxide ($Al_2O_3$), magnesium oxide, tungsten chloride, monobasic ammonium phosphate, $LiAlO_2$, $Li_2TiO_3$, $Li_2ZrO_3$, $LiBO_3$, and $Li_3PO_4$. The amount of a heterogeneous element in the above-described heterogeneous element compound may be controlled to be in a range of 0.0001 mol to about 0.1 mol, for example, about 0.0005 mol to about 0.03 mol, for example, about 0.001 mol to about 0.03 mol, or for example, about 0.001 mol to about 0.01 mol, based on the total molar ratio of the transition metal and heterogeneous element in the nickel-based active material secondary particle. When such a heterogeneous element compound is added, the heterogeneous element compound is present on or at the interface between the primary particles of the nickel-based active material and/or the surface of the primary particles. When the above-identified heterogeneous element compound is added during the second heat treatment, it may be used without mixing with a solvent, but in some cases, a solvent may be used. As the solvent, water, ethanol, and/or the like is used. As described herein above, the compound including at least one element selected from the heterogeneous elements is applied on the unit interface of the nickel-based active material secondary particle, and thus, surface exposure of the nickel-based active material is minimized or reduced when cracks occur. The existence and distribution of the compound including at least one element selected from the heterogeneous elements may be observed by electron probe microanalysis (EPMA) and secondary ion mass spectroscopy (Nano-SIMS).

The metal hydroxide, which is a nickel-based active material precursor used in the aforementioned method of preparing the cathode active material according to an embodiment of the present disclosure, may be produced by the following embodiment of the method. According to the following embodiment of the method, a metal hydroxide having a radial arrangement, having porosity, and including plate particles may be produced. The method of producing the metal hydroxide is not limited, but, for example, a coprecipitation method, and/or a solid phase method may be used.

Hereinafter, a method of preparing the metal hydroxide compound of Formula 2 as an example of metal hydroxide by coprecipitation will be described.

The nickel-based active material precursor according to embodiments of the disclosure may be produced by changing process conditions gradually or in stages such as, for example, changing the concentration and/or amount of a metal source and/or the concentration and/or amount of ammonia water as a complexing agent.

According to an embodiment, in the first action, a complexing agent, a metal source, and a pH adjuster are introduced into a reactor, and a first reaction thereof is carried out. When the pH of a reaction mixture in the reactor changes as the reaction proceeds, if necessary or desired, a pH adjuster is added to control the pH of the reaction mixture to be in a set or predetermined range.

Subsequently, in the second action, a second reaction is carried out while reducing stirring power. Then, in the third action, a third reaction is carried while increasing the concentration of a complexing agent.

The stirring power in each of the second and third actions is reduced as compared with the stirring power in the first action. The stirring power in the second action may be the same (e.g., substantially the same) as the stirring power in the third action. The stirring power in each action is in a range of about 0.1 $KW/m^2$ to about 7 $KW/m^2$.

The pH of each of the reaction mixtures in the first, second and third actions is controlled to be in a range of about 10 to about 12 (e.g., in a range of about 10 to about 11).

In the method of producing the aforementioned nickel-base active material, the concentration of the complexing agent gradually increases from the first action to the second action and then to the third action. The concentration of the complexing agent may be in a range of about 0.1 M to about 0.7 M in each of the first to third actions. As the complexing agent, for example, ammonia water is used.

In the first action, the pH of the reaction mixture is maintained, and the raw material is introduced to form the center portion of particles. In the second action, in order to prevent or reduce the reduction of a growth rate according to the growth of particles after reacting the product obtained in the first action for a set or predetermined amount of time, the amounts and/or concentrations of the metal source and/or the complexing agent are increased.

Subsequently, in the third action, in order to prevent or reduce the reduction of a growth rate according to the growth of particles after reacting the product obtained in the second action for a set or predetermined amount of time, the amounts and/or concentrations of the metal source and/or the complexing agent are increased. The porosity in the nickel-based active material precursor particles is determined depending on the time applied to each action.

In the nickel-based active precursor according to an embodiment, the porous structure is influenced by the amount of the metal source, the concentration of the complexing agent, and the pH of the reaction mixture.

The pH adjuster controls the pH of the reaction mixture to form a precipitate from the reaction mixture, and examples thereof include sodium hydroxide (NaOH), sodium carbonate ($Na_2CO_3$), and sodium oxalate ($Na_2C_2O_4$). For example, as the pH adjuster, sodium hydroxide (NaOH) is used.

The complexing agent controls a precipitate formation rate in a coprecipitation reaction, and examples thereof include ammonium hydroxide ($NH_4OH$) (aqueous ammonia) and citric acid. The amount of the complexing agent is used at a general level. For example, as the complexing agent, ammonia water (aqueous ammonia) is used.

The concentration of the complexing agent may be in a range of about 0.1 M to about 0.7 M, for example, about 0.2 M to about 0.5 M. The concentration of the metal source may be about 0.1 M to about 0.5 M, for example, 0.3 M.

In the first action, the amount of the metal source may be about 50 ml/min to about 100 ml/min, and the amount of the complexing agent may be about 8 ml/min to about 12 ml/min.

Subsequently, in the second action, the metal source and the complexing agent are added to the reaction product obtained in the first action, the pH of the reaction mixture is controlled, and a reaction is carried out.

In the second action, the concentration of the complexing agent may be about 0.3 M to about 1.0 M, the amount of the metal source may be about 90 ml/min to about 120 ml/min, and the amount of the complexing agent may be about 14 ml/min to about 18 ml/min.

Subsequently, in the third action, the metal source and the complexing agent are added to the reaction product obtained in the second action, the pH of the reaction mixture is controlled, and a reaction is carried out to prepare a nickel-based active material precursor.

In the third action, the concentration of the complexing agent may be in a range of about 0.35M to about 1.0M.

The reaction conditions of the third action greatly affect the surface depth of a porous layer in the nickel-based active material precursor.

In the third action, the amount of the metal source may be about 120 ml/min to about 170 ml/min, and the amount of the complexing agent may be about 19 ml/min to about 22 ml/min.

In the above production process, as the metal source, a metal precursor corresponding thereto is used in consideration of the composition of the nickel-based active material precursor. Examples of the metal source may include metal carbonate, metal sulfate, meta nitrate, and metal chloride.

When the compound represented by Formula 2 is to be prepared, a manganese precursor, a nickel precursor, and a cobalt precursor are used as the metal source. Examples of the manganese precursor, the nickel precursor, and the cobalt precursor may include manganese sulfate, nickel sulfate, cobalt sulfate, manganese chloride, nickel chloride, and cobalt chloride.

Hereinafter, a method of manufacturing a lithium secondary battery including a cathode including the cathode active material according to embodiments of the disclosure, an anode, a non-aqueous electrolyte including a lithium salt, and a separator will be described in more detail.

The cathode and the anode are prepared by applying a cathode active material layer forming composition and an anode active material layer forming composition to respective current collectors, and the compositions are dried.

The cathode active material layer forming composition is prepared by mixing a cathode active material, a conductive agent, a binder, and a solvent. The cathode active material according to embodiments of the disclosure is used as the cathode active material. The active material represented by Formula 1 above may be used as the nickel-based active material.

Examples of the binder may include polyvinylidene fluoride, polyvinyl alcohol, carboxymethyl cellulose (CMC), starch, hydroxypropyl cellulose, regenerated cellulose, polyvinyl pyrrolidone, tetrafluoro ethylene, polyethylene, polypropylene, ethylene-propylene-diene terpolymer (EPDM), sulfonated EPDM, styrene-butadiene rubber, fluoride rubber, and various copolymers.

Examples of the conductive agent may include graphite such as natural graphite and artificial graphite; a carbonaceous material such as carbon black, acetylene black, Ketjen black, channel black, furnace black, lamp black, and thermal black; conductive fiber such as carbon fiber and metal fiber; metal powder such as aluminum powder, and nickel powder; carbon fluoride powder conductive whisker such as zinc oxide and potassium titanate; conductive metal oxide such as titanium oxide; and conductive materials such as polyphenylene derivatives.

A non-limiting example of the solvent may be N-methylpyrrolidone (NMP).

The amounts of the binder, the conductive agent and the solvent are used at any suitable level generally used in the art.

The cathode current collector may have a thickness of about 3 μm to about 500 μm and may be any suitable current collector that does not cause any undesirable chemical change in the corresponding battery and has high electrical conductivity. Examples of the positive current collector include stainless steel, aluminum, nickel, titanium, calcined carbon; or aluminum or stainless steel surface-treated with carbon, nickel, titanium or silver. The cathode current collector may be processed to have fine irregularities on the surface thereof so as to enhance adhesiveness of the cathode current collector to the cathode active material, and may be used in any of various suitable forms including films, sheets, foils, nets, porous structures, foams, and non-woven fabrics.

Separately, the anode active material layer forming composition is prepared by mixing an anode active material, a binder, a conductive agent, and a solvent.

A material capable of absorbing and desorbing lithium ions is used as the anode active material. Non-limiting examples of the anode active material include graphite, a carbonaceous material (such as carbon), lithium metal, an alloy thereof, and silicon oxide. In certain embodiments, silicon oxide is used.

The same (e.g., substantially the same) conductive agent and solvent as used in the cathode may be used in the anode.

The anode current collector may have a thickness of about 3 μm to about 500 μm and may be any suitable current collector that does not cause any undesirable chemical change in the corresponding battery and has electrical conductivity. Examples of the anode current collector include copper, stainless steel, aluminum, nickel, titanium, calcined carbon, an aluminum-cadmium alloy; or copper or stainless steel surface-treated with carbon, nickel, titanium or silver. The anode current collector may also be processed to have fine irregularities on the surface thereof so as to enhance adhesiveness of the anode current collector to the anode active material in the same (e.g., substantially the same) manner as the cathode current collector, and may be used in any of various suitable forms including films, sheets, foils, nets, porous structures, foams, and non-woven fabrics.

As the anode, an anode made of a lithium metal or a lithium metal alloy may be used. The lithium metal alloy includes a metal/metalloid capable of being alloyed with a lithium metal, or an oxide thereof. Examples of the metal/metalloid capable of being alloyed with a lithium metal, or the oxide thereof may include Si, Sn, Al, Ge, Pb, Bi, Sb, an Si—Y alloy (Y is selected from alkali metals, alkaline earth metals, elements of groups 13 to 16, transition metals, rare earth elements, and combinations thereof, not Si), an Sn—Y alloy (Y is selected from alkali metals, alkaline earth metals, elements of groups 13 to 16, transition metals, rare earth elements, and combinations thereof, not Sn), and $MnO_x$ ($0<x\leq2$).

The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof. Examples of the oxide of the metal/metalloid capable of being alloyed with a lithium metal may include lithium titanium oxide, vanadium oxide, lithium vanadium oxide, $SnO_2$, and $SiO_x$ ($0<x<2$).

A separator may be placed between the cathode and the anode, each electrode being manufactured as described above.

The separator may have a pore diameter of about 0.01 μm to about 10 μm and a thickness of about 5 μm to about 300 μm. Non-limiting examples of materials for forming the separator include an olefin-based polymer (such as polypropylene or polyethylene) and glass fiber. In some embodiments, the separator may have a sheet or non-fabric (e.g., non-woven) form. When a solid electrolyte, such as a polymer, is used as the electrolyte, the solid electrolyte may also act as a separator.

The non-aqueous electrolyte containing a lithium salt may include a non-aqueous solvent and a lithium salt. Examples of the non-aqueous electrolyte may include an organic solid electrolyte and an inorganic solid electrolyte.

Non-limiting examples of the non-aqueous solvent may include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, 2-methyl tetrahydrofuran, dimethyl sulfoxide, 1,3-dioxolane, formamide, N,N-dimethylformamide, acetonitrile, nitromethane, methyl formate, methyl acetate, triester phosphate, trimethoxy methane, sulfolane, methyl sulfolane, 1,3-dimethyl-2-imidazolidinone, a tetrahydrofuran derivative, ether, methyl propionate, and ethyl propionate.

Non-limiting examples of the organic solid electrolyte may include a polyethylene derivative, a polyethylene oxide derivative, a polypropylene oxide derivative, a phosphate ester polymer, polyvinyl alcohol, and polyvinylidene fluoride.

Non-limiting examples of the inorganic solid electrolyte may include $Li_3N$, LiI, $Li_5NI_2$, $Li_3N$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt may be any suitable material that is easily dissolved in the non-aqueous solvent. Non-limiting examples thereof may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower aliphatic carboxylate lithium, and tetrakisphenyl lithium borate.

Figure 6:
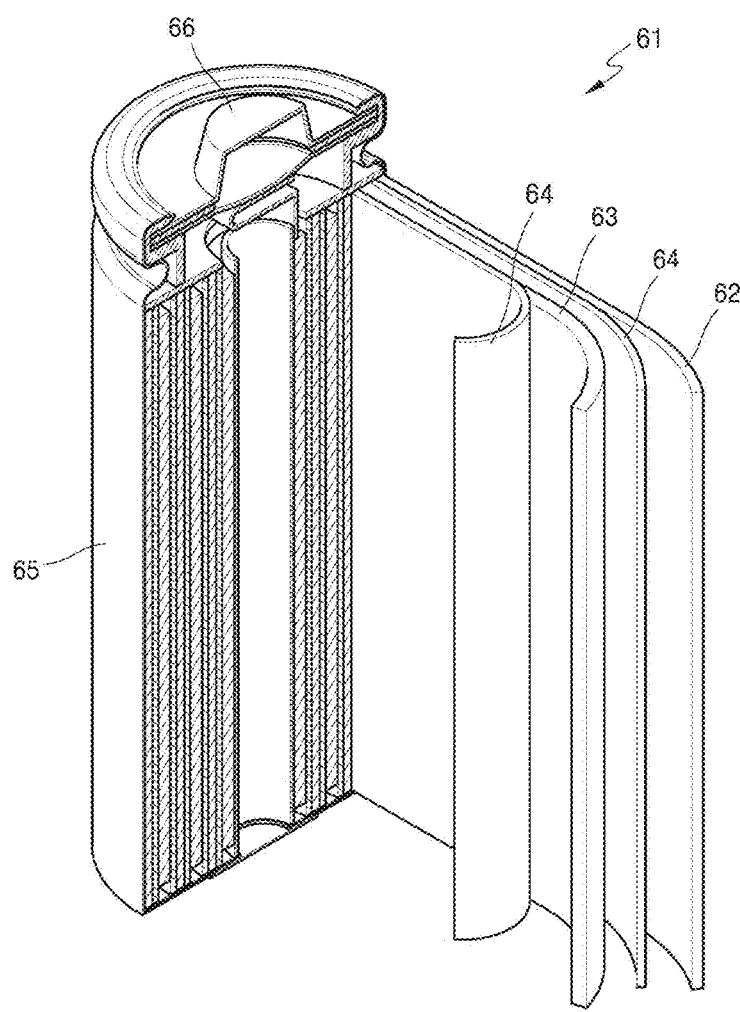
FIG. 6 is a perspective view schematically illustrating a structure of a lithium secondary battery that includes a cathode including a cathode active material according to an embodiment of the present disclosure.

FIG. 6 is a schematic view of a structure of a lithium secondary battery according to an embodiment of the present disclosure.

Referring to FIG. 6, the lithium secondary battery 61 includes a cathode 63, an anode 62, and a separator 64. The cathode 63, the anode 62, and the separator 64 may be wound or folded, and then sealed in a battery case 65. Then, the battery case 65 may be filled with an organic electrolyte and sealed with a cap assembly 66, thereby completing the manufacture of the lithium secondary battery 61. The battery case 65 may be a cylindrical type case, a rectangular type case, or a thin-film type case. For example, the lithium secondary battery 61 may be a thin-film type battery. For example, the lithium secondary battery 61 may be a lithium ion battery. The separator 64 may be between the cathode 63 and the anode 62 to form a battery assembly. The battery assembly may be stacked in a bi-cell structure and impregnated with the organic electrolyte. The resultant assembly may be put into a pouch and hermetically sealed, thereby completing the manufacture of a lithium ion polymer battery. In some embodiments, a plurality of battery assemblies may be stacked to form a battery pack, which may be used in any suitable device that requires high capacity and high output, for example, in a laptop computer, a smart phone, or an electric vehicle.

The lithium secondary battery may have excellent storage stability at a high temperature, improved lifetime characteristics, and high rate characteristics, and thus, may be used in an electric vehicle (EV), for example, in a hybrid electric vehicle such as a plug-in hybrid electric vehicle (PHEV).

Embodiments of the subject matter of the present disclosure will be described in more detail with reference to the following Examples and Comparative Examples. However, these Examples are set forth to illustrate embodiments of the present disclosure, and therefore, the scope of the present disclosure is not limited thereto.

In the preparation Examples, $NiSO_4*6H_2O$, $CoSO_4*7H_2O$, and $MnSO_4*H_2O$ were used as a metal source, and ammonia water was used as a complexing agent.

PREPARATION EXAMPLE 1

Preparation of Composite Metal Hydroxide—First Action

First, ammonia water having a concentration of 0.30 M was put into a reactor. A metal source and a complexing agent (ammonia water) were introduced at flow rates of 90 ml/min and 10 ml/min under the conditions of a stirring power of 1.5 $kW/m^3$ and a reaction temperature at 50° C., respectively, to start a reaction. The reaction was carried out for 6 hours while adding sodium hydroxide (NaOH) to maintain the pH in a range of 10 to 11. It was found that the average size of the particles obtained as the result of the reaction was in the range of about 5.5 om to about 6.5 μm. Then, the second action was carried out as follows.

Second Action

A metal source and a complexing agent were introduced at flow rates of 100 ml/min and 15 ml/min while maintaining the reaction temperature at 50° C., respectively, to maintain the concentration of the complexing agent at 0.35 M. The reaction was carried out for 6 hours while adding sodium hydroxide (NaOH) to maintain the pH in a range of 10 to 11. In this case, the reaction proceeded after reducing the stirring power to 1.0 $kW/m^3$. It was found that the average size of the particles obtained as the result of the reaction was in the range of about 9 μm to about 10 μm. Then, the third action was carried out as follows.

Third Action

A metal source and a complexing agent were introduced at flow rates of 150 ml/min and 20 ml/min while maintaining the reaction temperature at 50° C., respectively, to maintain the concentration of the complexing agent at 0.40 M. The reaction was carried out for 6 hours while adding sodium hydroxide (NaOH) to maintain the pH in a range of 10 to 11. In this case, the stirring power was maintained to be substantially the same as that in the second action.

The reaction product was washed with distilled water and then dried in a hot air oven for 24 hours to obtain composite metal hydroxide ($Ni_{0.6}Co_{0.2}Mn_{0.2}(OH)_2$) as radial and porous plate particles.

EXAMPLE 1

Preparation of Nickel-Based Active Material Secondary Particles

The composite metal hydroxide powder of Preparation Example 1 ($Ni_{0.6}Co_{0.2}Mn_{0.2}(OH)_2$) and lithium hydroxide ($LiOH.H_2O$) having an average particle diameter of about 10 μm were dry-mixed using a high-speed mixer at a rate of 2,000 rpm. The mixture was subjected to a first heat treatment at a temperature of about 850° C. for about 8 hours in an oxidizing atmosphere, thereby obtaining nickel-based active material secondary particles ($LiNi_{0.6}Co_{0.2}Mn_{0.2}O_2$).

100 parts by weight of the nickel-based active material secondary particles and 0.2 parts by weight of polyvinylidene fluoride were dry-mixed using a high-speed mixer at a rate of 2,000 rpm to obtain a reaction mixture. The reaction mixture was subjected to a second heat treatment at a temperature of about 350° C. for about 6 hours in an oxidizing atmosphere, thereby obtaining nickel-based active material secondary particles.

EXAMPLE 2

Preparation of Nickel-Based Active Material Secondary Particles

Nickel-based active material secondary particles were obtained in substantially the same manner as in Example 1, except that the second heat treatment temperature was changed to 450° C.

COMPARATIVE EXAMPLE 1

Preparation of Nickel-Based Active Material Secondary Particles

The composite metal hydroxide powder of Preparation Example 1 ($Ni_{0.6}Co_{0.2}Mn_{0.2}(OH)_2$) and lithium hydroxide ($LiOH.H_2O$) having an average particle diameter of about 10 μm were dry-mixed using a high-speed mixer at a rate of 2,000 rpm. The mixture was subjected to a first heat treatment in a calcining furnace at a temperature of about 800° C. for about 6 hours in an oxidizing atmosphere, thereby obtaining nickel-based active material secondary particles ($LiNi_{0.6}Co_{0.2}Mn_{0.2}O_2$).

The nickel-based active material secondary particles were subjected to a second heat treatment at a temperature of about 850° C. for about 6 hours in an oxygen atmosphere, thereby obtaining nickel-based active material secondary particles.

COMPARATIVE EXAMPLE 2

Preparation of Nickel-Based Active Material Secondary Particles

Nickel-based active material secondary particles ($LiNi_{0.6}Co_{0.2}Mn_{0.2}O_2$) were obtained in substantially the same manner as in Comparative Example 1, except that the second heat treatment temperature was changed to 890° C.

COMPARATIVE EXAMPLE 3

Preparation of Nickel-Based Active Material Secondary Particles

The composite metal hydroxide powder of Preparation Example 1 ($Ni_{0.6}Co_{0.2}Mn_{0.2}(OH)_2$) and lithium hydroxide ($LiOH.H_2O$) having an average particle diameter of about 10 μm were dry-mixed using a high-speed mixer at a rate of 2,000 rpm. The mixture was subjected to a first heat treatment in a calcining furnace at a temperature of about 800° C. for about 6 hours in an oxidizing atmosphere, thereby obtaining nickel-based active material secondary particles ($LiNi_{0.6}Co_{0.6}Mn_{0.2}O_2$).

100 parts by weight of the nickel-based active material secondary particles and 0.2 parts by weight of polyvinylidene fluoride were dry-mixed using a high-speed mixer at a rate of 2,000 rpm to obtain a reaction mixture. The reaction mixture was subjected to a second heat treatment at a temperature of about 850° C. for about 6 hours in an oxidizing atmosphere, thereby obtaining nickel-based active material secondary particles.

Because the nickel-based active material obtained according to Comparative Example 3 had a high second heat treatment temperature, fluorine coating was substantially not formed.

COMPARATIVE EXAMPLE 4

Preparation of Nickel-Based Active Material Secondary Particles

Nickel-based active material secondary particles were obtained in substantially the same manner as in Comparative Example 3, except that the first heat treatment temperature was changed to about 850° C., polyvinylene fluoride was not used during the second heat treatment, and the second heat treatment temperature was changed to about 350° C.

MANUFACTURE EXAMPLE 1

Manufacture of Coin Cell

A lithium secondary battery (coin cell) was manufactured by using the nickel-based active material secondary particles obtained according to Example 1 as the cathode active material as follows.

96 g of the secondary particles of the nickel-based active material ($LiNi_{0.6}Co_{0.2}Mn_{0.2}O_2$) of Example 1, 2 g of polyvinylidene fluoride, 47 g of N-methylpyrrolidone (as a solvent), and 2 g of carbon black (conductive agent), were mixed. Bubbles were removed from the mixture using a mixer, thereby preparing a homogeneously dispersed slurry for forming a cathode active material layer.

The slurry obtained in this way was applied on an aluminum foil using a doctor blade to form a thin electrode plate. The thin electrode plate was then dried at a temperature of 135° C. for 3 hours or more, and then pressed and vacuum-dried to form a cathode.

A separator (thickness: about 16 μm) made of a porous polyethylene (PE) film was placed between the cathode and a lithium metal counter electrode. Then, an electrolyte was injected thereinto, thereby manufacturing of a CR2032-type coin cell.

A solution containing 1.1 M $LiPF_6$, which was dissolved in a mixed solvent of ethylene carbonate (EC) and ethylmethylcarbonate (EMC) at a volumetric ratio of 3:5, was used as the electrolyte.

MANUFACTURE EXAMPLE 2

Manufacture of Coin Cell

A coin cell was manufactured in substantially the same manner as in Manufacture Example 1, except that the nickel-based active material secondary particles obtained according to Example 2 were used instead of the nickel-based active material secondary particles obtained according to Example 1.

COMPARATIVE MANUFACTURE EXAMPLES 1 to 4

Manufacture of Coin Cells

Coin cells were manufactured in substantially the same manner as in Manufacture Example 1, except that the nickel-based active material secondary particles obtained according to Comparative Examples 1 to 4 were used instead of the nickel-based active material secondary particles obtained according to Example 1.

EVALUATION EXAMPLE 1

Evaluation of Amount of Residual Lithium

Amounts of residual lithium present on the surfaces of the cathode active materials prepared in Example 1, Example 2, Comparative Example 1, Comparative Example 3, and Comparative Example 4 were measured, and the results thereof are given in Table 1 below.

The amounts of residual lithium were evaluated by measuring the amount of LI in $LiCO_3$ and LiOH remaining in the surface of the cathode active material by a wet method (or titration method).

As an example measuring method, for example, reference can be made to the method disclosed in paragraph [0054] of Japanese Patent Application Publication No. 2016-081903, the contents of which are incorporated herein by reference.

TABLE 1

| Class | Amounts of residual lithium |
|---|---|
| Comparative Example 1 | 1559 |
| Comparative Example 3 | 1062 |
| Comparative Example 4 | 1467 |
| Example 1 | 906 |
| Example 2 | 1045 |

As given in Table 1, it was found that the cathode active materials of Examples 1 and 2 had lower residual lithium amounts than the cathode active materials of Comparative Examples 1, 3, and 4.

EVALUATION EXAMPLE 2

Charge-Discharge Characteristics (Initial Efficiency)

The coin cells of Manufacture Example 1, Manufacture Example 1, Comparative Manufacture Example 2, and Comparative Manufacture Example 3 were charged at a constant current of 0.1 C rate up to a voltage of 4.30 V (vs. Li), and then cut-off at a current of 0.05 C rate while maintaining 4.30 V in a constant voltage mode. Subsequently, the coin cells were discharged at a constant current of 0.1 C rate up to a voltage of 3.0 V (vs. Li) ($1^{st}$ cycle, formation cycle).

Initial charge-discharge efficiencies of the coin cells were measured, and the results thereof are given in Table 2 below. The initial charge-discharge efficiencies were measured according to Equation 1:

Initial charge-discharge efficiency [%]=[$1^{st}$ cycle discharge capacity/$1^{st}$ cycle charge capacity]×100  Equation 1

Each of the coin cells was repetitively charged and discharged 50 times under the condition of a current of 1C rate at a temperature of 45° C., and the ratio of $50^{th}$ discharge capacity to $1^{st}$ discharge capacity was examined. The charging was performed in a constant current (CC) mode, then continued in a constant voltage (CV) mode, and cut off at a current of 0.05 C while maintaining 4.30 V. The discharging was performed in a constant current (CC) mode and cut off at a voltage of 3.0 V. The results thereof are given in Table 2 below, in which "I.C.E." refers to the initial charge-discharge efficiency. Lifetimes of the coin cells were measured according to Equation 2:

Lifetime [%] at 45° C.=[$50^{th}$ cycle discharge capacity/$1^{st}$ cycle charge capacity]×100  Equation 2

TABLE 2

| Class | Charge capacity (mAh/g) | Discharge capacity (mAh/g) | initial charge-discharge efficiency (I.C.E.) (%) | Lifetime[%] at 45° C. |
|---|---|---|---|---|
| Manufacture Example 1 | 197.9 | 187.6 | 94.8 | 98 |
| Manufacture Example 2 | 198.1 | 186.2 | 94.0 | 99 |
| Comparative Manufacture Example 2 | 198.5 | 184.4 | 92.9 | 93 |
| Comparative Manufacture Example 3 | 196.9 | 177.4 | 90.1 | 95 |

Referring to Table 2, it was found that the initial charge-discharge efficiencies of the coin cells of Manufacture Examples 1 and 2 were improved as compared to those of the coin cells of Comparative Manufacture Examples 2 and 3. Further, it was found that the lifetimes at 45° C. of the coin cells of Manufacture Examples 1 and 2 were improved as compared to those of the coin cells of Comparative Manufacture Examples 2 and 3.

EVALUATION EXAMPLE 3

Evaluation of Reduction in Gas Generation Amount During High-Temperature Storage The changes in thickness of the coin cells of Manufacture Example 1 and Comparative Manufacture Example 1 were measured while these coin cells were stored at a temperature of 60° C. for 13 days at an overcharge state of 4.4 V. In this test, the swelling degree was obtained by the maximum thickness change (Δt) relative to the initial thickness, and the results thereof are shown in FIG. 7.

Figure 7:
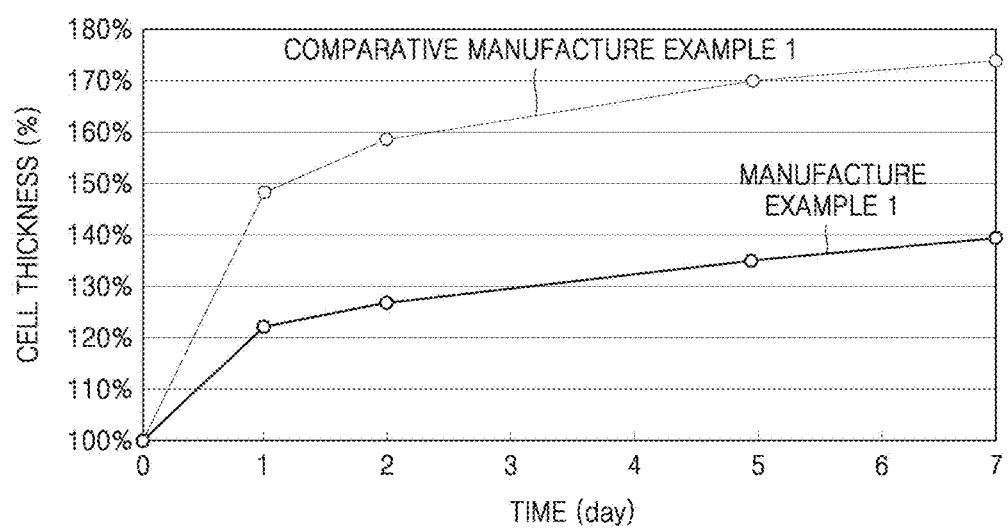
FIG. 7 is a graph showing changes in cell thickness during high-temperature storage in coin cells manufactured according to Manufacture Example 1 and Comparative Manufacture Example 1.

Referring to FIG. 7, it was found that the coin cell of Manufacture Example 1 has a reduced cell thickness increase rate after high temperature storage, as compared with the coin cell of Comparative Manufacture Example 1.

EVALUATION EXAMPLE 4

Porosity Evaluation using Scanning Electron Microscopy

The nickel-based active material secondary particles of Examples 1 and 2 were analyzed using the Magellan 400L scanning electron microscope (SEM). Pretreatment was performed on a sample cross section by milling using a JEOL CP2 for 4 hours at a voltage of 6 kV and a current of 150 μA. Then, the electron scanning analysis was performed under the condition of 350 V.

The results of the porosity evaluation are given in Table 3 below.

TABLE 3

| Class | | Porosity (%) |
|---|---|---|
| Example 1 | Inner portion | 10 |
| | Outer portion | 2 |
| Example 2 | Inner portion | 10 |
| | Outer portion | 2 |

As described above, in the cathode active materials for lithium secondary batteries according to embodiments of the present disclosure, the amount of residual lithium (e.g., residual lithium present at a surface of the nickel-based active material) is reduced. When a lithium secondary battery is manufactured using such a cathode active material, the amount of gas generated during high-temperature storage is reduced, thereby decreasing the thickness increase rate of a cell and improving capacity, efficiency, and lifetime characteristics of the cell.

EVALUATION EXAMPLE 5

Analysis using Scanning Electron Microscope

The nickel-based active material secondary particles of Example 1 was analyzed using a scanning electron microscope (SEM). The scanning electron microscope used herein was Magellan 400L (manufactured by FEI Company, Hillsboro, OR). A pretreatment was performed on a sample cross section by milling using an JEOL CP2 for 4 hours at a voltage of 6 kV and a current of 150 uA. Then, the electron scanning analysis was performed.

Figure 8:
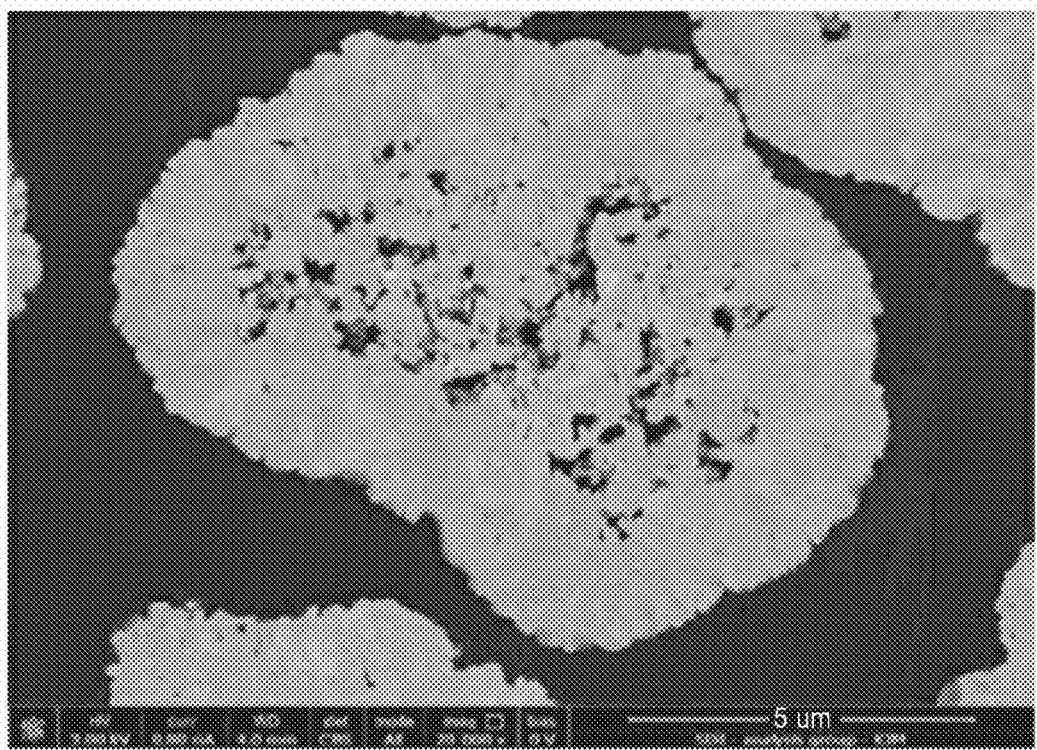
FIG. 8 is an SEM image of cross-sections and outer surfaces, respectively, of secondary particles of the nickel-based active material prepared according to Example

The results of the analysis are shown in FIG. 8.

FIG. 8 indicates that the nickel-based active material secondary particles of Example 1 had an outer portion with a radially arranged structure and an inner portion with an irregular porous structure.

It should be understood that embodiments described herein should be considered in a descriptive sense only and not for purposes of limitation. Descriptions of features or aspects within each embodiment should typically be considered as available for other similar features or aspects in other embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While one or more embodiments have been described with reference to the figures, it will be understood by those of ordinary skill in the art that various changes in form and details may be made therein without departing from the spirit and scope as defined by the following claims, and equivalents thereof.

What is claimed is:

1. A cathode active material for a lithium secondary battery, comprising:
    a secondary particle of a nickel-based active material, wherein the secondary particle comprises an aggregate of two or more primary particles,
    wherein the secondary particle comprises a radial arrangement structure in which the primary particles are aligned such that a (003) plane of each of the primary particles is perpendicular to an outermost plane of the secondary particle,
    50% or more of the primary particles are arranged to have the radial arrangement structure, and
    a lithium fluoride-based compound is present on a surface of the secondary particle,
    wherein a pore size of an inner portion of the secondary particle is about 200 nm to about 1 μm, and a pore size of an outer portion is less than 100 nm.

2. The cathode active material of claim 1, wherein the lithium fluoride-based compound comprises a reaction product of residual lithium present on the surface of the nickel-based active material and a fluoride precursor comprising at least one selected from a fluorine-containing polymer and metal fluoride.

3. The cathode active material of claim 2, wherein the fluorine-containing polymer comprises at least one selected from polyvinylidene fluoride, a vinylidene fluoride-hexafluoropropylene copolymer, and polytetrafluoroethylene.

4. The cathode active material of claim 1, wherein the fluorine of the lithium fluoride-based compound is included in an amount of about 0.2 parts by weight to about 1 parts by weight based on 100 parts by weight of the nickel-based active material.

5. The cathode active material of claim 1, wherein the fluorine of the lithium fluoride-based compound is included in an amount of about 0.01 parts by weight to about 1 parts by weight based on 100 parts by weight of the nickel-based active material.

6. The cathode active material of claim 1, wherein the secondary particle comprises a compound between the primary particles, and
    wherein the compound comprises at least one element selected from zirconium (Zr), titanium (Ti), aluminum (Al), magnesium (Mg), tungsten (W), phosphorus (P), and boron (B), or
    wherein the compound comprises lithium and at least one element selected from zirconium (Zr), titanium (Ti), aluminum (Al), magnesium (Mg), tungsten (W), phosphorus (P), and boron (B).

7. The cathode active material of claim 1, wherein the nickel-based active material comprises plate particles, and a long axis of each of the plate particles is aligned in a radial direction.

8. The cathode active material of claim 1, wherein the nickel-based active material comprises an active material represented by Formula 1:

$$Li_a(Ni_{1-x-y-z}Co_xMn_yM_z)O_2 \qquad \text{Formula 1}$$

wherein, in Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and wherein $0.90 \leq a \leq 1.3$, $x \leq (1-x-y-z)$, $y \leq (1-x-y-z)$, $z \leq (1-x-y-z)$, $0 < x < 1$, $0 \leq y < 1$, and $0 \leq z < 1$.

9. The cathode active material of claim 1, wherein a porosity of an inner portion of the secondary particle may be about 2% to about 20%, and the porosity of an outer portion of the secondary particle may be about 0.1% to about 5%.

10. A lithium secondary battery comprising:
    a cathode comprising the cathode active material of claim 1;
    an anode; and
    an electrolyte between the cathode and the anode.

11. The cathode active material of claim 1, wherein the secondary particle further comprises an irregular porous structure,
    wherein the primary particles in the irregular porous structure are arranged randomly, and
    wherein the radial arrangement structure is located closer to a surface of the secondary particle than the irregular porous structure.

12. A cathode active material for a lithium secondary battery, comprising:
    a secondary particle of a nickel-based active material, wherein the secondary particle comprises an aggregate of two or more primary particles,
    wherein the secondary particle comprises a radial arrangement structure in which the primary particles are aligned such that a (003) plane of each of the primary particles is perpendicular to an outermost plane of the secondary particle,
    50% or more of the primary particles are arranged to have the radial arrangement structure, and
    a lithium fluoride-based compound is present on a surface of the secondary particle,
    wherein a pore size of an inner portion of the secondary particle is about 150 nm to about 1 μm, and a pore size of an outer portion is less than 100 nm.

* * * * *

UNITED STATES PATENT AND TRADEMARK OFFICE
CERTIFICATE OF CORRECTION

| | | |
|---|---|---|
| PATENT NO. | : 12,080,882 B2 | Page 1 of 1 |
| APPLICATION NO. | : 17/494686 | |
| DATED | : September 3, 2024 | |
| INVENTOR(S) | : Donggyu Chang et al. | |

It is certified that error appears in the above-identified patent and that said Letters Patent is hereby corrected as shown below:

In the Claims

In Column 24, Line 3, in Claim 6, delete "aluminum (AI)," and insert -- aluminum (Al), --.

In Column 24, Line 19, in Claim 8, delete "aluminum (AI)," and insert -- aluminum (Al), --.

Signed and Sealed this
Fifteenth Day of April, 2025

Coke Morgan Stewart
*Acting Director of the United States Patent and Trademark Office*